March 5, 1935.  A. MOORHOUSE  1,993,015
MOTOR VEHICLE
Filed Sept. 17, 1932  2 Sheets-Sheet 2
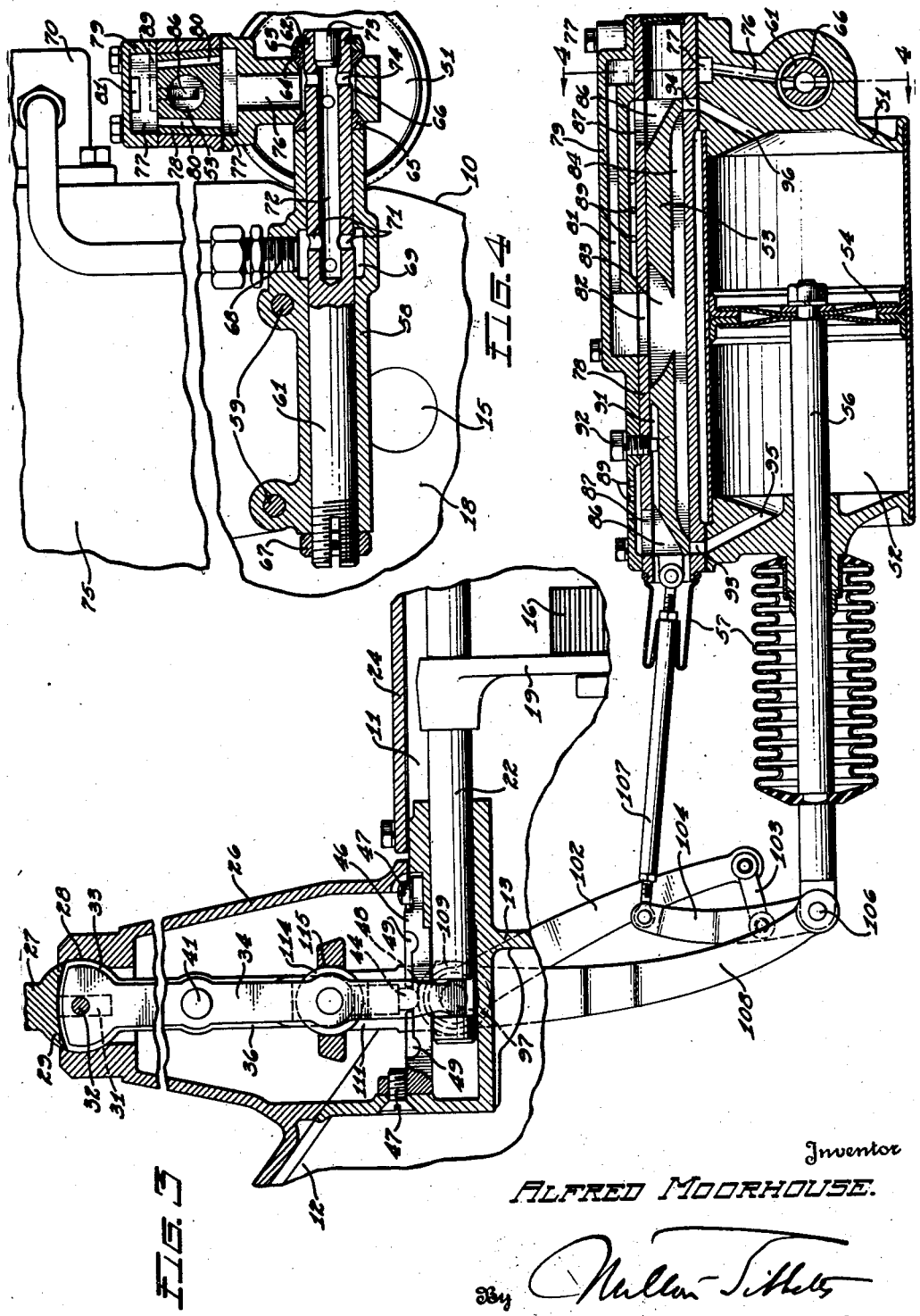
Inventor
ALFRED MOORHOUSE.
By
Attorney Patented Mar. 5, 1935

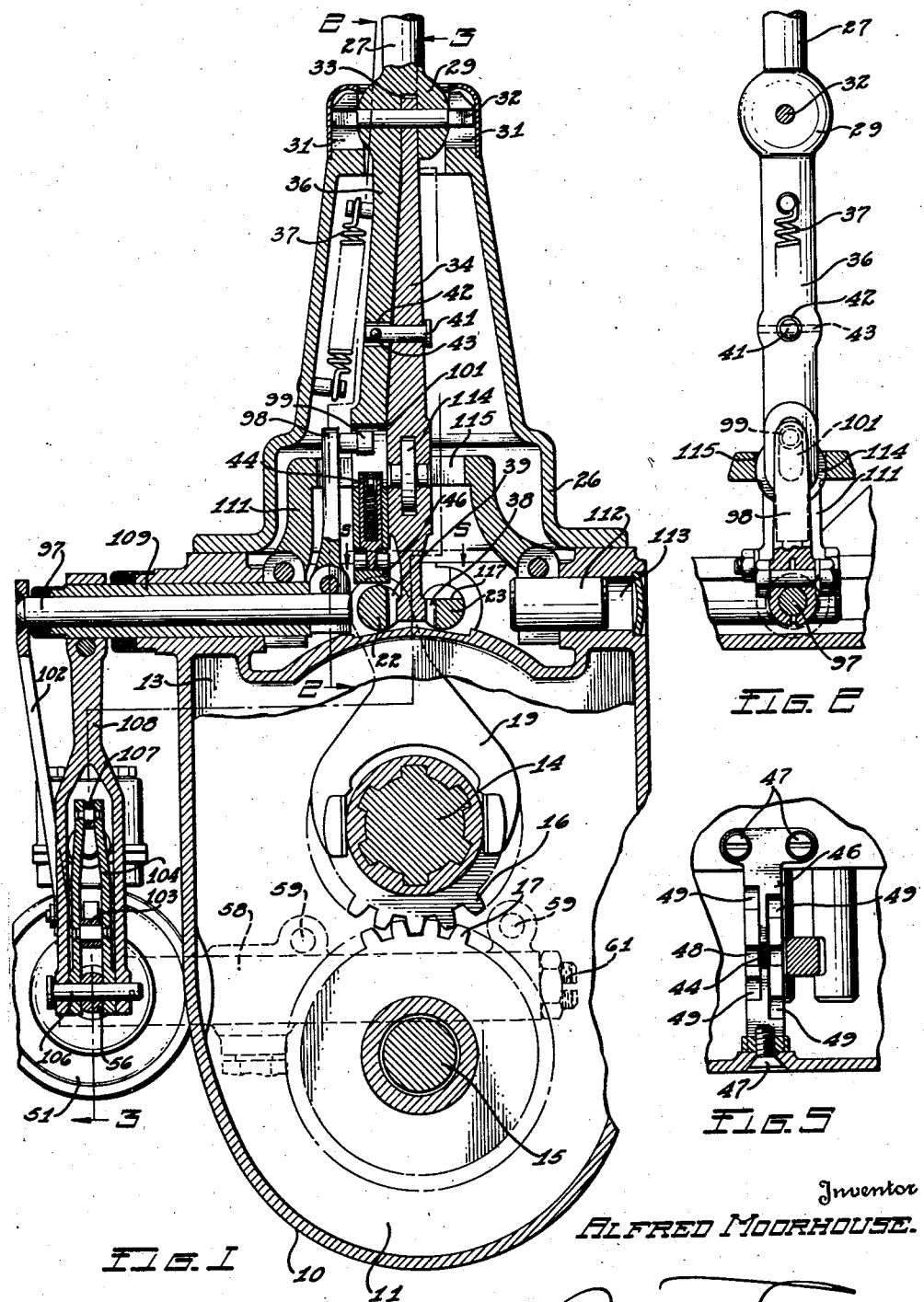

1,993,015

UNITED STATES PATENT OFFICE 1,993,015

MOTOR VEHICLE

Alfred Moorhouse, Detroit, Mich., assignor to Packard Motor Car Company, Detroit, Mich., a corporation of Michigan Application September 17, 1932, Serial No. 633,638

20 Claims. (Cl. 74—335)

This invention relates to motor vehicles and more particularly to controlling means for the power transmission system thereof.

Motor vehicles in general use have transmission gear sets which provide various torque or speed ratios between the motor and the rear wheels. The common way of selecting and engaging these gear sets is by means of a manually movable lever conveniently located near the hand of the driver.

There have been proposed various substitutes for the transmission, the transmission gear shifting lever, various positions for the shifting lever, and other modifications of the present generally used system, all designed for the purpose of simplifying the operations required of the driver. Some of these proposals are automatic, or semi-automatic, in their action, but most of them are more complicated to design, to manufacture, and to service than is the construction now in general use and they are, for these reasons, objectionable. On the other hand, there are definite objections to the construction now in general use and there is definite need for improvement if such improvement may be accomplished without running into the complications which form so powerful an obstacle to the prior proposals.

Perhaps the major objection to the present system is the length of movement required of the gear shift lever, or, if the movement is small, the relatively large force required to move the gear shift lever.

The complications of the prior constructions may be avoided, and the force and/or travel of the gear shift lever may be reduced by a suitable booster mechanism and one of the objects of my invention is to provide a trouble-free booster mechanism in which accessibility, ease of manufacturing, accuracy of control, and service considerations are some of the main features.

Another object of my invention is to design a mechanism in which a single power means may be used to boost a plurality of gear shifting movements made by the gear shift lever and its associated transmission gear sets.

Another object of the invention is to provide a transmission booster mechanism with an improved sensitivity of control so that small movements of the gear shift lever may immediately result in corresponding movements of the proper transmission parts.

Another object of this invention is to connect a single booster mechanism to a multi-shift transmission mechanism in such a way that, although the gear shifting movements of the operating lever may be unequal, the single booster mechanism will still function satisfactorily.

Other objects of the invention will appear from the following description taken in connection with the drawings, which form a part of this specification, and in which:

Fig. 1 is an end view, partly in section and partly in elevation, of a motor vehicle transmission system with which my invention is incorporated;

Fig. 2 is a sectional view taken substantially on the line 2—2 of Fig. 1 showing a portion of the gear shift lever and some of the operating mechanism;

Fig. 3 is a sectional view taken substantially on the line 3—3 of Fig. 1 showing a side view of the gear shift lever, of the transmission, and of the power mechanism;

Fig. 4 is a sectional view taken substantially on the line 4—4 of Fig. 3 showing a rear view of the power plant and of the power mechanism; and Fig. 5 is a sectional view of a portion of Fig. 1 taken substantially on the line 5—5 of Fig. 1 showing the guiding means for the gear shift lever.

Referring to the drawings, 10 illustrates a motor vehicle transmission case having a gear compartment 11 and a clutch compartment 12 separated by a dividing wall 13. Within the gear compartment and supported by the wall 13 and the rear wall of the casing 18, are the transmission shafts 14 and 15 adapted to be connected in various driving relationships by gear sets only one, composed of gears 16 and 17, of which is shown. Gears or dog clutch elements, such as 16, are adapted to be shifted by forks, such as 19, located within the gear compartment. In this manner, the gear ratio of the transmission mechanism is varied. The shifter forks may be, and usually are, mounted on axially slidable shifter rail elements 22 and 23 supported in the front wall 13 and the rear wall 18 of the transmission casing, and extending through the wall 13 above the gears and below the cover 24 of the gear compartment and the gear shift lever tower 26, which latter is fastened to the casing and serves as a support for a gear shift lever 27 manually controlled by the vehicle operator.

As shown, the gear shift tower is formed with a spherical bearing 28 for the reception of an enlarged spherical portion 29 of the gear shift lever. The spherical bearing 28 is formed with a pair of slots 31 which receive a pin 32 and serve to limit the movement of the gear shift lever to a rocking movement about the axis of the pin 32 longitudinally of the transmission and to a tilting movement transversely of the transmission. The spherical portion 29 of the gear shift lever 27 is formed with a recess 33 for the reception and guidance of a part 34 of the lower portion of the gear shift lever which I term the operating portion. Between the controlling portion 36 of the gear shift lever and the gear shift tower 26 lies a coil spring 37 under initial load. The purpose of this spring is to tend to keep the gear shift lever 27 tilted so that the operating portion 34 thereof will normally be in constant engagement with a slot 38 formed in the shifter rail 23. A corresponding slot 39 is formed in the shifter rail 22 and at the will of the vehicle operator the gear shift lever 27 may be rocked transversely of the transmission so that the operating portion 34 of the gear shift lever engages one or the other of the shifter rails, and after such engagement has been accomplished, the gear shift lever is then rocked about the pivot pin 32 longitudinally of the transmission and one of the shifter rails is moved longitudinally of the transmission, accomplishing the desired gear ratio selection. A generally used arrangement employs the shifter rail 22 for the engagement of low and reverse gears and the shifter rail 23 for the engagement of second and high gears, the forward position of the shifter rails being respectively low and high gears. In the position shown, the shifter rails are in the neutral position and the vehicle operator has moved the gear shift lever to a position midway between the shifter rails 22 and 23.

One of the features of my invention involves the application of power from an external source to the operating portion 34 of the gear shift lever and also relates to mechanism whereby the controlling portion 36 of the gear shift lever regulates the application of such power. When power is available, therefore, the gear shift lever 27 and its lower or controlling portion 36 become merely a regulating means for the power device controlling the beginning and ending of its operation and selecting which of the shifter rails shall be operated and in which direction it shall be operated. When, for any reason, power is not available, the manually moved gear shift lever 27 then, by means of a lost motion connection between the controlling portion 36 and the operating portion 34, becomes the sole actuating member for the shifter rail. This lost motion connection includes a stud 41 projecting through the operating lever 34 and into an aperture 42 in the controlling member 36 which aperture is somewhat larger in diameter than the stud 41. A pin 43 projects through a drilled hole in the stud 41 and has a little clearance in this hole. The pin 43 serves to keep the operating lever 34 and the controlling member 36 close together along their contacting faces, but by virtue of the clearance between the pin 41 and the hole 42 relative rotation of 34 and 36 may occur about the pin 32 in the enlarged spherical portion 29 of the lever. It is this lost motion which permits the controlling lever 36 to move ahead of the operating lever 34 and regulate the power means.

The lower portion of the controlling lever 36 continues down within the gear shift tower 26 until its lower end, in which is mounted a spring-pressed plunger 44, engages a plate 46 screwed, as at 47, to the transmission case. Figs. 3 and 5 best show the shape of the upper face of this plate which serves as a guiding and limiting means for the movement of the controlling portion 36 of the gear shift lever. It is seen that the face of the plate is cut away in an H-shaped manner and that there is a groove 48 running transversely of the plate in the middle of the H and it is also seen that there are grooves 49 at the end of each of the four legs of the H. The fact that the four legs are unequal in length is due to the unequal length of the movements required to engage reverse or the three forward gear ratios of the conventional transmission. The grooves 49 serve as detents for the tang of the plunger and the ends of the H serve to prevent movement of the gear shift controlling member 36 beyond the proper position. The H slot, by controlling the movements of the controlling member 36, serves to limit the movement of the operating member 34. This is due to the fact that as soon as the controlling member 36 stops moving, the power device, in a manner to be described, immediately tends to take up the lost motion which has initially occurred between the controlling member 36 and the operating member 34, and as soon as the lost motion has been completely taken up, the power is then automatically cut off from the operating member. In this manner the grooves 49 in the face of the plate 46 serve to limit the movement of the shifter rails 22 and 23.

Generally speaking, the power mechanism itself comprises a power cylinder, a valve controlling the piston therein, interconnections between the valve and piston so that initial movement of the valve results in the application of power to the piston and final movement of the piston returns the valve to its initial position, thereby cutting off the power. The valve is controlled as before indicated by the movement of the controlling portion 36 of the gear shift lever and power from the piston is applied through suitable transmitting means to the operating portion 34 of the gear shift lever and from there to whichever of the shifter rails has been selected by the vehicle operator.

More in detail, the power mechanism consists of a power unit casing 51 having a cylinder 52 and a valve member 53. Within the cylinder 52 is a piston 54 having a piston rod 56 projecting through the end wall of the cylinder and connected with an operating linkage to be described. The valve 53 also projects through an end wall of the power unit casing and is connected to a valve operating linkage. Suitable shields 57, which may be of rubber, serve to seal the power unit casing against the entrance of dirt through the valve or piston rod openings.

The support for the power unit casing 51 includes a tubular holder 58 bolted as at 59 to the rear wall 18 of the transmission casing. Through the holder 58 runs a shaft 61 having, on the outer surface thereof at one end, a snap ring 62, a washer 63, and a pair of spacer members 64 and 65, each having opposed conical surfaces. Spacer 65 abuts the end of the holder 58. The shaft 61 pierces a bore 66 in the power unit casing having a larger diameter than the shaft and having the ends bevelled off to correspond with the conical faces of the spacers 64 and 65. This shaft and spacer assembly, shown particularly in Fig. 4, is placed in the holder 58 and a nut 67 pulls the spacers 64 and 65 against the conical walls forming the ends of the bore 66 in the power unit casing 51.

A screw fitting 68 registers with a recess 69 in the holder 58 and with radial passage-ways 71 formed in the shaft 61. An axial passage-way 72 closed by a plug 73 extends along the shaft 61 until the bore 66 in the power unit casing 51 is reached at which point further radial passage-ways 74 are formed in the shaft. The bore 66 registers with a passage-way 76 leading to a recess 77 surrounding a passage-way extending axially of the power unit casing. Within this passage-way is located a valve guiding member 78 held in place by a cover 79 bolted to the casing. Drilled holes 80 in the valve guiding member connect the upper and lower portions of recess 77 which communicates with an axial passage 81 formed in the cover 79 leading to the middle of the power unit casing and there registering with an opening 82 formed in the valve guiding member 78 and with an opening 83 and an axial groove 84 formed in the valve member 53.

Thus, if the screw fitting 68 is connected by a conduit to a source of power, such as the intake manifold 70 of an internal combustion engine 75, a partial vacuum will exist in the axial groove 84 at all times during operation of the engine.

The ends of the valve member 53 are bevelled as at 86 and register with further openings 87 in the valve guiding member 78. These openings 87 are in communication with the atmosphere through suitable apertures 89 formed in the cover 79 of the power unit casing 51. Formed in the upper surface of the valve member 53 is a slot 91 into which the end of a bolt 92 extends and thus rotation of the valve member 53 is prevented.

By an inspection of Fig. 3 it will be noted that the valve member 53 is cut away so that openings 93 and 94 in the guide member 78, communicating in turn with passage-ways 95 and 96 leading to opposite ends of the cylinder 52, are covered only when the valve is in the middle or neutral position as shown. If, however, the valve should be moved to the right or left from such neutral position, it is seen that one of the openings 93 or 94 would be placed in communication with the source of vacuum and the other would be placed in communication with the atmosphere and the difference in the pressures exerted on the opposite sides of the piston 54 would result in movement of the piston in a direction corresponding to that in which the valve 53 was moved.

I will now describe the valve operating mechanism connecting the controlling member 36 with the valve member 53 and also the power transmitting mechanism connecting the piston rod 56 with the operating member 34. The valve operating mechanism includes a shaft 97 projecting through the transmission case from a point adjacent the lower end of the gear shift lever. Rigidly held on the shaft is an arm 98 having a roller 99 thereon which projects through an elongated slot 101 formed in the controlling portion 36 of the gear shift lever. The roller 99 has sufficient axial length so that the gear shift lever 36 may be tilted in the plane of Fig. 1 without withdrawing the roller from the slot 101. Rocking of the gear shift lever longitudinally of the transmission, whether it be in engagement with shifter rail 22 or with shifter rail 23, has a tendency to rotate the arm 98 and the shaft 97. On the outer end of the shaft 97 is a depending arm 102 the lower end of which is pivotally secured to a connecting link 103 which in turn is pivotally secured to a lever 104. Lever 104, which may be of the yoke type as shown in Fig. 1, is secured at one end to a pin 106 which projects through the end of the piston rod 56 and the other end of the lever 104 is secured to the end of a valve operating connecting rod 107 which is adjustable in length and which is pivotally secured to the valve member 53. Lever 104 forms a connecting means between the valve operating mechanism and the power transmitting mechanism which has the function of beginning to shut off power whenever the piston 54 catches up to the valve 53, that is to say, whenever the operating member 34 catches up to the controlling member 36.

The power transmitting connection between the piston rod 50 and the operating portion 34 of the gear shift lever comprises a yoke 108 pivoted on the pin 106 and rigidly secured at its upper end to a sleeve 109 which runs through the wall of the transmission case 10. As shown, the sleeve forms a bearing for the valve operating shaft 97. Secured to the inner end of the sleeve 109 is an operating arm 111, bent up above the shifter rails immediately adjacent the valve arm 98, and running across the transmission casing over the shifter rails and down on the other side where it is additionally supported by a stud 112 mounted on the end of the arm and rotating in a bore 113 in the transmission case. That portion of the power operating arm which extends across the transmission above the shifter rails is widened and slotted to receive the lower end of both parts of the shifter lever. The operating portion 34 is provided with a roller 114 having a diameter equal to the slot 115 formed in the upper arm 111. It is thus seen that as the piston 54 moves axially of the cylinder 52, arm 111 is rotated and this movement, by means of the roller 114, moves the operating portion 34 of the gear shift lever and in turn moves shifter rail 22 or shifter rail 23 in the direction selected by the operator. It is, of course, clear that there is sufficient clearance between the controlling portion 36 of the gear shift lever and the slot 115 in the operating arm 111 so that movement between 34 and 36 will not result in a contact between the member 36 and the arm 111.

The purpose of the flattened portion 117 on shifter rail 23 now becomes evident. It is seen that the gear shift lever 27 and the gear shift tower 26 form a removable assembly, but in order to remove this assembly from the transmission case 10, it is necessary to move the shifter lever 27 until the roller 99 clears the slot 101 in the controlling portion 36 of the gear shift lever 27. The flattened portion 117 of the gear shift lever 23 will permit this lateral movement of the lower portion of the gear shift operating lever 34, and the length of the slot 115 will permit a corresponding movement of the roller 114. Thus, the gear shift lever and the gear shift tower may be removed from the transmission without interfering with the adjustment of the power mechanism. This is an important advantage from the service point of view. The operation of the valve operating and power transmitting mechanism may perhaps best be described by considering what occurs during any one shift. Let us consider the shift from neutral, the position shown, into low gear. The gear shift lever 27 is rocked transversely of the transmission within in the spherical bearing until the tang of the plunger 44 moves into the left-hand portion, as seen in Fig. 5, of the H slot cut in the face of plate 46. This movement also pulls the arm 34 into engagement with shifter rail 22 clearing shifter rail 23. The top of the gear shift lever 27 is then pulled backwards by the operator, rotating the gear shift lever about the axis of the pin 32 and moving the lower portion 36 of the gear shift lever forward. This carries the roller 99 forward and the lower end of the arm 102 to the rear, pulling the link 103 to the rear and rocking the lever 104 about the pin 106. Up to this point we have considered the pin 106 as being stationary. Movement of the lever 104 will be in the direction to move the connecting rod 107 to the rear and carry with it the valve member 53. This in turn has the effect of placing the bore 96 in communication with the partial vacuum existing in the slot 84 as previously described and exposes the bore 95 to atmospheric pressure through the apertures 89. The difference between the atmospheric pressure and the partial vacuum causes the piston to move to the rear which moves the lower end of the lever 108 to the rear and rotates the sleeve 109 and the arm 111 and causes contact between the walls of the slot 115 and the roller 114. Thus, power is applied from the piston to the operating lever 34 and from there to the shifter rail 22 moving it forwardly and moving the first speed sliding gear 16 into engagement with 17. During the rearward motion of the piston 54, the upper end of the lever 104 moves to the left, as viewed in Fig. 3, or forwardly, while the link 103 remains substantially stationary. This movement of the upper end of the lever 104 has a tendency to force the valve member 53 to move forward, that is, back to its initial neutral position. As there is no further movement of the gear shift lever 27, and accordingly no further movement of the lever 104, the piston will move only so far as is necessary to bring the valve member 53 back to its neutral position at which point the passages 96 and 95 will be closed off and all further piston movement will cease.

Thus, the position of the valve 53 is always controlled by the position of the controlling lever 36, regulated by the vehicle operator, and the position of the connecting linkages between the piston operating mechanism and the valve operating mechanism. The movement from any gear position to any other gear position is accomplished by the above described sequence of events excepting that the motion of the valve 53 will always be in the same direction as the motion of the upper part of the manually controlled gear shift lever 27 and the movement of the hand lever will result first in movement of the valve and then in movement of the piston until it catches up with the valve and then movement of the valve back to closed position and then in stopping of the piston. These movements are designed to occur in rapid sequence and as a result the vehicle operator is able to shift gears with a much reduced physical effort and with a reduction in the movement of the manually controlled gear shift lever.

It is thus seen that I have provided a booster mechanism comprising a single piston adapted to be associated in operative relation with any one of a plurality of shifter rails. Furthermore, the gear shift tower 26, in addition to supporting the gear shift lever, in a slidably removable relationship with the valve operating mechanism and the power operated arm 111, also serves as a cover means for a large part of the booster mechanism, keeping it dust free.

By having the valve mechanism within the tower and intimately associated with the gear shift lever, it is seen that accuracy and sensitivity of control are both possible. Due to the fact that the gear shift lever is slotted to the booster mechanism a sliding engagement is possible and removal of the lever may be accomplished without disturbing the adjustment of the mechanism.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle transmission, gear shifting elements, a manually operable lever having a portion engageable to operate the elements and a control portion, a power device, a valve controlling the power device, a connection between the lever control portion and the valve, and means connecting the power device in operative relation with the element operating portion of the lever.

2. In a motor vehicle transmission, a pair of shifting elements for selecting a plurality of gear ratios, a manually operated member, a power device for shifting said elements, and means including a lost motion connection and associated with said member operatively to connect said power device with either of said elements.

3. In a motor vehicle transmission, a pair of gear shifting elements; a manually operated member; a power device including a single piston and a valve; and operating means associated with said power device to actuate said valve and to connect said piston with either of said elements, said operating means including an arm pivoted to the transmission, a lever concentrically pivoted with the arm, and linkage connecting said lever and arm and said valve and piston.

4. In a motor vehicle transmission, a casing, gear shifting elements within the casing, a manually operable means extending into the casing having a shifter portion manually engageable with the elements and a control portion, a power device located outside the casing, control means for the power device, connecting means between the control means and the control portion of the manually operable means, and mechanism operated by the power device for actuating the shifter portion of the manually operable means.

5. In a motor vehicle transmission; a pair of gear shifting elements; a manually operated member; a power means comprising a single piston and a valve; and operating means associated with said power means to actuate said valve and operatively to connect said piston with either of said elements, said operating means including a pivoted lever operatively associated with said manually operated member to transmit power to said gear shifting elements.

6. In a motor vehicle transmission; a pair of gear shifting elements; a manually operated member; a power means comprising a single piston and a valve; and operating means associated with said power means to actuate said valve and operatively to connect said piston with either of said elements, said operating means including a lever pivoted to the transmission and operatively associated with said manually operated member to transmit power to said gear shifting elements, a second lever concentrically pivoted with respect to the first lever, and linkage connecting said levers to said valve and piston.

7. In a motor vehicle transmission; a pair of gear shifting elements; a manually operated member; a power means comprising a single piston and a valve; and yoke operating means associated with said power means to actuate said valve and operatively to connect said piston with either of said elements, said operating means including a lever pivoted to the transmission, a second lever concentrically pivoted with the first lever, and linkage connecting said levers together and to said valve and piston.

8. In a motor vehicle transmission having a casing containing a plurality of shiftable ratio selecting elements and manually operated means for controlling the shifting of said elements; power mechanism associated with said manually operated means for reducing the manual effort required to move said elements, said power means comprising valve means and piston means located outside said casing, valve operating means connecting said manually operated means with said valve means, and power transmitting mechanism extending from said piston means within the casing and operatively engageable with said manually operated means for shifting said elements.

9. In a transmission, the combination of a plurality of shiftable gear ratio selecting elements, power mechanism for assisting the shifting of said elements comprising a valve operating element and a fluid actuated member, and a manually operated control member comprising means to actuate the valve element and means pivotally associated with said valve element actuating means to operate one or the other of said shiftable elements.

10. In a transmission having a plurality of shiftable gear ratio selecting elements and power mechanism for assisting the shifting of said elements comprising a valve operating element and a fluid actuated member; a manually operated control member comprising means to actuate the valve element and lost motion means pivotally associated with said actuating means to operate one or the other of said shiftable elements.

11. In a transmission having a plurality of shiftable gear ratio selecting elements each having a common midpoint and different ranges of movements on either side of said midpoint, a manually operated member having a range of movement at least as great as the maximum movement of any element, power mechanism comprising a single fluid actuated member associated in operative relationship with and controlled by said manually operated member, and means for limiting the movement of said manually operated member and said power mechanism in accordance with the range of movement of the selected element.

12. In a transmission having a plurality of shiftable gear ratio selecting elements each having a common midpoint and different ranges of movements on either side of said midpoint; a manually operated member having a range of movement at least as great as the maximum movement of any element; and power mechanism comprising a single fluid actuated member associated with said manually operated member, valve means associated in operative relationship with said manually operated member for controlling the fluid actuated member, and means for limiting the movement of said manually operated member and said power mechanism in accordance with the range of movement of the selected element.

13. In a transmission having a casing and a plurality of shiftable gear ratio selecting elements each having a common midpoint and different ranges of movements on either side of said midpoint; a manually operated member having a range of movement at least as great as the maximum movement of any element; power mechanism comprising a single fluid actuated member associated with said manually operated member, valve means associated in operative relationship with said manually operated member for controlling the fluid actuated member, and means associated with the casing for limiting the movement of said power mechanism in accordance with the range of movement of the selected element.

14. In a transmission having a casing and a plurality of shiftable gear ratio selecting elements each having a common midpoint and different ranges of movements on either side of said midpoint; a manually operated member having a range of movement at least as great as the maximum movement of any element; power mechanism comprising a single fluid actuated member associated with said manually operated member, means associated in operative relationship with said manually operated member, and means including a stop associated with the casing and yieldable means connecting the stop to the manually operated member for limiting the movement of said power mechanism in accordance with the range of movement of the selected element.

15. In a transmission having a plurality of shiftable gear ratio selecting elements and power mechanism for assisting the shifting of said elements comprising a valve operating element and a fluid actuated member; a manually operated control member comprising means to actuate the valve element and means pivotally associated with said valve element actuating means to operate one or the other of said shiftable elements.

16. In a transmission having a manually movable member and a shiftable element adapted to be shifted by said member, a power mechanism for assisting the manually movable member comprising a movable casing having a piston and a valve for controlling the movement of the piston, a pivot for supporting said casing, duct means connecting said pivot with said valve, and stationary means connecting said pivot with the source of power.

17. In a transmission having a casing and shiftable elements; a lever adapted to be associated in shifting relation with said elements, said lever comprising a manually operated portion and a power operated portion; power controlling mechanism associated with said casing and said manually operated portion; power mechanism associated with said casing adapted to move said power operated portion; and cover means for said mechanisms forming a support for said lever.

18. In a transmission mechanism, the combination with members for selectively associating gears in a plurality of ratios, of control means comprising a lever engageable to shift said members, a power actuator device connected to the lever to actuate the same, and a power device control means connected to the lever, said lever regulating said power device control means.

19. In a transmission mechanism, the combination with elements for selectively associating gears in a plurality of ratios, of a manually operable shifter lever associated with said elements, power means including a piston and a control valve, means connecting the piston with the lever, and means connecting the lever with the control valve.

20. In a transmission mechanism, the combination with members for selectively associating gears in a plurality of ratios, of control means comprising a manually operable lever engageable to shift said members, a vacuum device connected to said lever, said device being operable to actuate said lever, and control means for the vacuum device connected with the lever in a relation to be regulated thereby.

ALFRED MOORHOUSE.